United States Patent
Kuivalainen

(10) Patent No.: US 8,260,282 B2
(45) Date of Patent: *Sep. 4, 2012

(54) METHOD, DEVICE AND SOFTWARE FOR UPDATING DATA IN MOBILE DEVICES

(75) Inventor: Uki Kuivalainen, Jyvaskyla (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,499

(22) Filed: Sep. 22, 2011

(65) Prior Publication Data

US 2012/0023184 A1    Jan. 26, 2012

Related U.S. Application Data

(63) Continuation of application No. 11/597,003, filed as application No. PCT/FI2005/050162 on May 17, 2005, now Pat. No. 8,027,670.

(30) Foreign Application Priority Data

May 19, 2004   (FI) ...................................... 20040697

(51) Int. Cl.
*H04M 3/00* (2006.01)
*H04M 1/00* (2006.01)

(52) U.S. Cl. ....... 455/419; 455/517; 455/41.2; 455/3.01

(58) Field of Classification Search .................. 455/419, 455/3.01, 41.2, 452.1, 418, 414.1, 550.1, 455/3.05, 412.1, 414.2, 420, 553.1, 517, 455/520, 417; 709/204; 717/173, 178
See application file for complete search history.

(56) References Cited

U.S. PATENT DOCUMENTS

| 6,034,621 | A  | * | 3/2000 | Kaufman ..................... 340/7.21 |
| 2003/0130882 | A1 |   | 7/2003 | Shuttleworth et al. |
| 2004/0093380 | A1 | * | 5/2004 | Sellen et al. .................. 709/204 |
| 2004/0122870 | A1 |   | 6/2004 | Park et al. |

FOREIGN PATENT DOCUMENTS

EP         0917077         11/1998

* cited by examiner

Primary Examiner — John J Lee
(74) Attorney, Agent, or Firm — Alston & Bird LLP

(57) ABSTRACT

Updating data between the mobile devices belonging to a given user group is shown. In a mobile device (301, 302), there can be recorded information (406) of the members of a given user group, and a connection can be established from the device (301, 302) to other devices (303, 304, 401) of the user group members. In addition, the device includes means for defining the changing information as update data (407) related to said user group, and means for transmitting (303, 304, 401) the update data automatically to each device belonging to the user group through a defined connection bus. The device also includes means for receiving (303, 304, 401) the data defined to be updated, and means for saving (406, 407) the received update data in the device.

12 Claims, 2 Drawing Sheets

METHOD, DEVICE AND SOFTWARE FOR UPDATING DATA IN MOBILE DEVICES

BACKGROUND

The invention relates to updating data between mobile devices belonging to a given user group.

The use of electric devices and applications is becoming more and more popular. A typical electric application is a calendar application used in work sites, in the personal computers of employees. Calendar applications in computers are quick and easy to use. In addition, the entries made in the calendar are for example in a work community visible for other members as well, so that the free and already reserved hours of a certain person can be rapidly checked in the calendar application. For instance, when negotiating a meeting, it is not necessary to contact all participants separately, but it suffices that their calendars can be accessed. In preparation, possibly suitable points of time can be seen directly through the calendar application. New calendar entries can also be transmitted and synchronized between the devices of the users. Typically the receiver has yet to accept the new calendar entry, before it is registered in the receiver application. Altered data related to several persons can be updated at the same time for all persons concerned.

Electronic calendar applications are common in portable devices, too. In these, the updating of data is not as straightforward as between stationary devices. Applications provided in portable computers are typically updated for example by means of a log file located in the employer's server, when the portable computer is on the employer's network. Corresponding automatic updating cannot be realized between personal portable devices. However, portable communicators include more and more versatile features, and their use is continuously growing. A mobile device can be updated by means of a given stationary device located for instance in a personal work station. Yet mobile devices, and their use as the only work station, are becoming more and more popular, and updating through a stationary device is then not efficient. The updating frequency depends on the user, and the passage of information remains user-specific. There also are servers offering for example a calendar application that is common for several users. The users can update their personal devices on the basis of common information registered on the server. These so-called intelligent servers are not, however, available for small user groups. The updating function between smaller user groups is carried out by transmitting the altered data separately for each receiver. This kind of data updating is inefficient, time-consuming and susceptible to errors, because the manual updating operations are dependent on the user performing the update.

BRIEF SUMMARY

An object of the invention is to realize rapid, automatic data updating between mobile communication devices. Another object of the invention is to make the updating of data between mobile devices easy and user-friendly. Yet another object of the invention is to realize an updating method suited for small user groups for updating data in mobile devices.

These objects are achieved so that in the devices belonging to a given user group, there can be defined such update data related to the user group that is updated in other devices belonging to the same user group. The updating is carried out automatically through a connection bus used between the devices belonging to said user group.

Embodiments of the invention are described below.

According to an embodiment of the invention, a device belonging to a given user group changes a piece of information related to all users of said group. This update data is defined to be updated also for other devices belonging to said user group. The information of the devices belonging to the user group, such as identifiers and connection information, are available for all devices of the user group, for example as registered in a separate user group list in the memory of the devices. As an alternative, devices belonging to a given user group can be marked with a given tag or special label in connection with identification information already stored in the memory. When the data to be updated, for example a calendar entry, is fed in one device of the group, the data is updated also in other devices belonging to the same user group.

According to embodiments of the invention, the update data can be transmitted through any known transmission protocol, through a given bus that is available. Possible alternatives are for example transmission over the air (OTA), by means of messages or locally, so that the devices are interconnected during the updating process. As examples of data transmission protocols, let us mention GPRS (General Packet Radio Services), GSM (Global System for Mobile Communication), WLAN (Wireless Local Area Network) as well as the Bluetooth and infrared (IR) techniques. Depending on the employed connection bus and data transmission protocol, the receiver is identified for example on the basis of the telephone number, name, ID identifier or some other identifier of the device. It is also possible to secure the correct receiver by simultaneously using two different pieces of receiver information, for instance device identifier and personal data.

According to an embodiment of the invention, the updating is carried out through the network, so that the update data and receiver data are transmitted through that network under which the devices are located. For instance by utilizing the WAP (Wireless Application Protocol) technique, a so-called WAP Push message can be transmitted to the receiver. As an alternative, the update data can be transmitted through the network in text form, for example as a so-called smart SMS (Short Message Service) message. The advantage of messages is that they can also be transmitted later, in case the receiver cannot be contacted exactly at the moment of updating. If the receiver is not located under the network in question, or his personal device is switched off, the message remains waiting for example on the messaging center or network server. According to an embodiment, the message is transmitted to the receiver when his device is next time detected on or under the network in question.

According to an embodiment, mobile devices are updated when two devices belonging to the same group arrive at a given distance from each other. For example in the Bluetooth technique, the updating is carried out between devices belonging to a given user group, when the mutual distance between the devices is no more than 100 meters. In case the employed updating bus is a bus utilizing the infrared technique, the devices must stay in visual contact during the updating process.

In case the receiver is not reached at the moment of updating, the device belonging to the user group is updated next time when it is reached. According to an embodiment, it is possible to define for the device to be updated a primary updating method and bus, and in case the updating fails, other buses can be used for updating the device.

According to embodiments of the invention, the updating of changing information is carried out automatically between devices belonging to a given user group. According to embodiments of the invention, the updating function is particularly useful for small groups, such as a family, hobby group or the like, where the changing information, such as calendar information, can according to embodiments of the invention be synchronized easily and rapidly between the group members. By means of the automatic updating function according to embodiments of the invention, the updated data related to the group is always available for all group members, and it can always be effortlessly updated.

BRIEF DESCRIPTION OF THE DRAWING

There is observed some embodiments of the invention in more detail with reference to the appended drawings, where.

DETAILED DESCRIPTION

Figure 1:
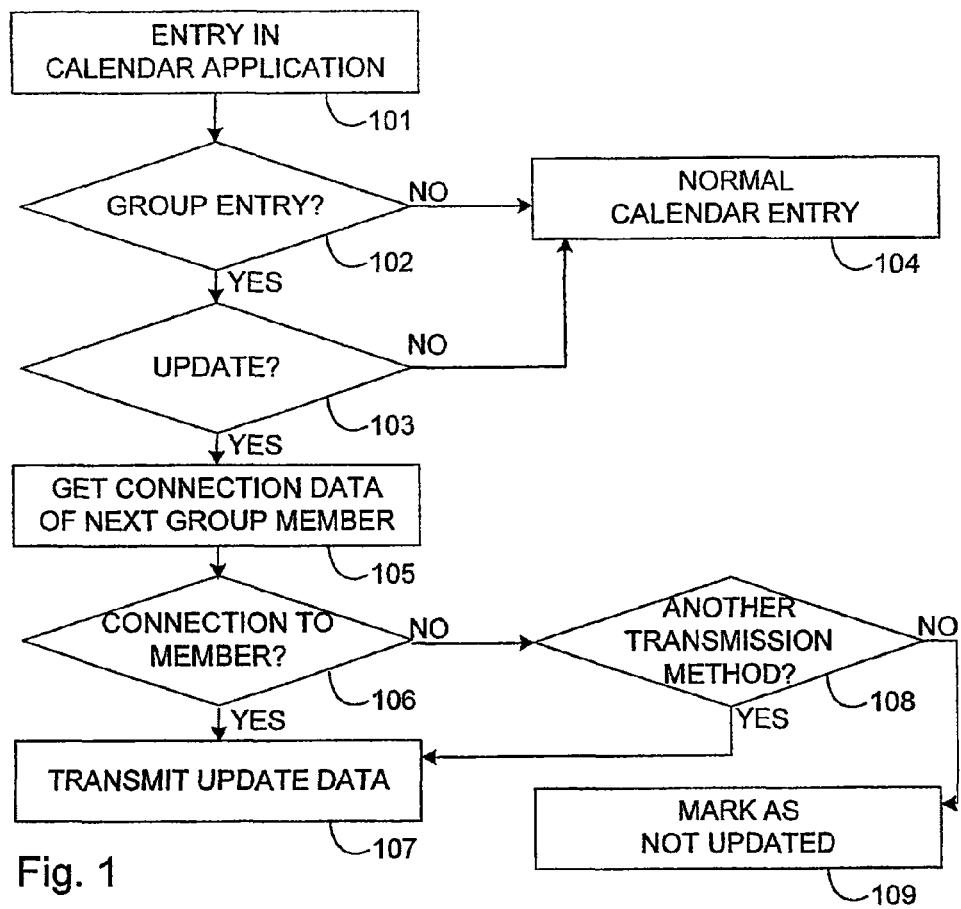
FIG. 1 illustrates a method according to an embodiment of the invention for transmitting update data.

FIG. 1 illustrates how data is updated between mobile devices according to an embodiment of the invention. The mobile device according to this embodiment includes an element or alternatively means for defining the user group and an element or alternatively means for recording the data of the user group members. There may even be several user groups, as long as the members of a given user group can be identified for instance by an identifier or by the user group name. In the embodiment of FIG. 1, the user makes an entry in the calendar application in step 101. Making an entry here means that the user records new or altered data in the calendar application. The new or altered data can mean adding new information, or editing or deleting already existing information. In case the entry should be updated for all members of a given predetermined user group, this is indicated when saving the new entry. The user may for example save an entry so that he selects in the device menu the option "save for group", defining also the user group for which the entry should be updated. According to another embodiment, it is possible to activate a separate group update command after the saving operation, and to define the target user group. According to a third embodiment, a user group identifier, for example the user group name, is added in the calendar entry. The indication of calendar entries can be carried out by any known and/or suitable way. According to the embodiments, the entries related to a given user group, to be updated for the user group members, are indicated so that the performing software detects certain calendar entries as entries to be updated for the members of a given user group.

In step 102 it is checked whether the input entry is a group entry that is meant to be updated for the members of a given user group. The checking is carried out on the basis of the above mentioned identifier. In case such identifiers are not used, but the updating process is activated separately, this step need not be performed, and the method proceeds directly to step 103. In case a group entry is detected in step 102, it is yet possible to request a confirmation from the user in step 103 whether the updating should be carried out for the devices of the given user group. In case an identifier indicating a group entry is not detected in step 102, or the user cancels the updating in step 103, the input entry is a normal calendar entry related only to said user's device according to step 104. Now the updating in the user group devices is not carried out. According to an embodiment, the updating is carried out only in case the user gives a separate update command according to step 103. In case said command is not detected, the entry is interpreted as a normal calendar entry that is saved (only) in said device.

In case a group entry is detected in step 102, and/or an update command is detected or confirmed in step 103, the connection information of the member of the user group that was defined to be updated is looked up in step 105. Typically the data of the user group and its members is stored in the device memory. The user group can be enlisted in a separate list, or the members of a given user group can be marked with a certain identifier. In an embodiment of the invention, a list of the user group members is used. According to another embodiment, the user information saved in the device memory is searched for finding the members of a given user group. In step 105, the connection information of the first found member of the user group is looked up. According to an embodiment, a connection to said member is established in step 106. The connection can be established for instance by the infrared or Bluetooth technique. In case a connection can be established, the update data to be synchronized is transmitted to the user group member in step 107. Thereafter the procedure is continued from step 105, where the connection information of the next member of the user group is looked up.

In case a connection with the user group member under observation cannot be established at the moment in question in step 106, the method proceeds to aq step 108. In step 108, it is checked whether another method of transmission is defined for transmitting update data. In case an alternative transmission method is defined or exists, the update data can be transmitted by using said second transmission method according to step 107. As an alternative, the update data can be transmitted for example in message-form through the network under which the devices are located. If an alternative transmission method is still not found, or if the update data cannot be transmitted therethrough at the moment in question in step 108, said user group member is marked as not updated in step 109. According to an embodiment, the memory of the updating device includes a log file where notes of the updating process are made. The log file typically contains information of those devices that could not be updated. The synchronization of the update can be carried out later, for example when a connection is next time established with said device. Thereafter the process continues from step 105, where the connection information of the next user group member is looked up. When all user group members are handled, the process is finished.

Figure 2:
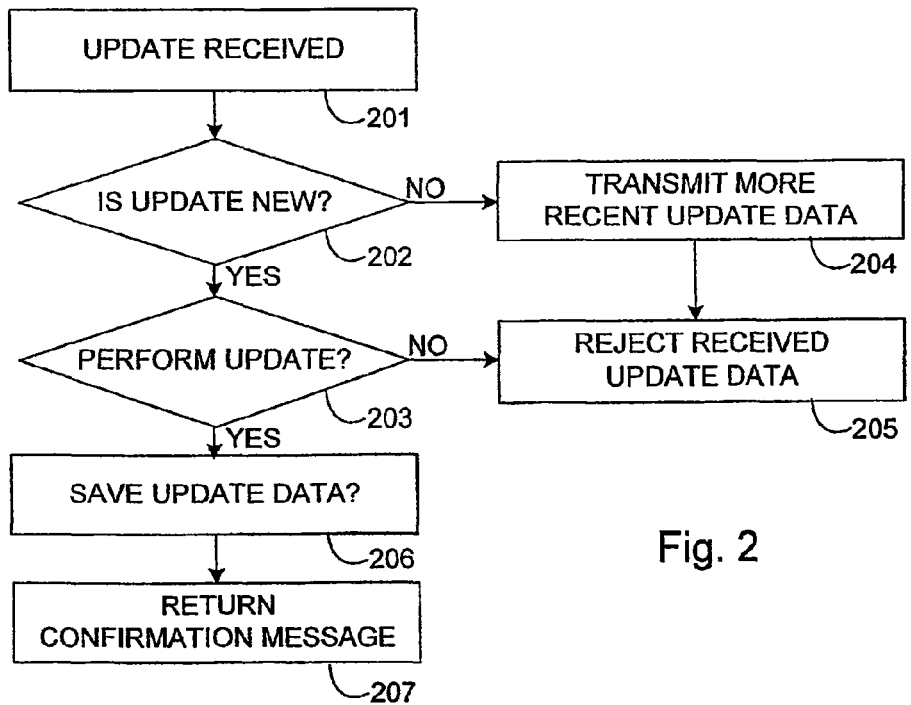
FIG. 2 illustrates a method according to an embodiment of the invention for receiving update data.

FIG. 2 illustrates a method for receiving update data in a mobile device. In step 201 there is received update data that is defined to be updated for the members of a given user group. In step 202, there is checked by means of software provided in the receiving device whether the update data is new. For instance existing data included in the calendar application of the device is compared with the received update data. In case the receiver's calendar application contains a corresponding entry as the received update data, the time information of both entries is checked first. The latest, timewise most recent entry is saved in the calendar application. In case the received update data is found to be more recent than the existing data in step 202, the user is yet asked to confirm in step 203 whether the received update data is saved in his calendar application. In case the user confirms the saving in step 203, the received update data is saved in the calendar application in step 206. According to an embodiment, the receiver still returns a confirmation message of receiving the update data to its sender in step 207. After receiving the confirmation message, the transmitter can for example register it in its log file, or acknowledge the updating as having been performed in some other way.

In case in step 202 it is detected that the received update data is older than the entry already existing in the calendar application, the corresponding more recent calendar application entry can be transmitted to be updated to the transmitter in step 204 and the received, older update data is rejected according to step 205. The calendar application entry that is detected to be more recent and related to the user group can be transmitted to the transmitter according to an embodiment of the invention. The received update data is also rejected in step 205 in case the user rejects the updating in step 203.

According to an embodiment of the invention, at the initiative of a first device, update data is transmitted to a second device, when a connecting bus can be arranged between said devices for transmitting update data. The connection established in this embodiment is typically one between two devices (not a multipoint connection). The second, receiving device detects that its memory unit contains a corresponding piece of information, for example a calendar entry relating to the same issue. Further the device processes the received update data, compares it with the corresponding entry saved in its memory and detects that the entry contained in its memory is edited at a later point of time than the received update data. By means of the processing software, the receiving device rejects the later, received update data. In addition, according to an embodiment, the second device automatically starts synchronizing the user group devices. In practice the second device transmits the more recent update data contained in its memory to be synchronized in the first device. Respectively, data can be transmitted and updated several times, until the latest information related to said user group is synchronized in all user group devices.

Figure 3:
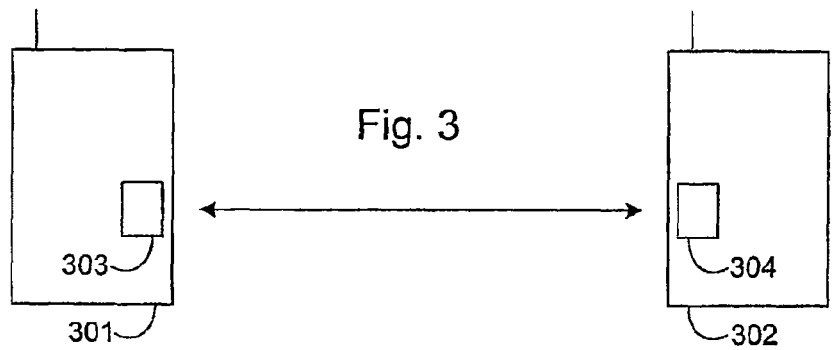
FIG. 3 illustrates an arrangement according to an embodiment of the invention for transmitting update data through a short-range connection.

In the embodiment of FIG. 3, the update data is transmitted along a short-range connection. The user's mobile device 301, 302 can be a mobile phone, a computer, a pencil PC (personal digital assistant, PDA) or a corresponding device. The device 301, 302 according to the embodiment illustrated in FIG. 3 includes an element or means for defining the user group and for saving the information of the user group members. In addition, the device 301 according to the embodiment can be used for establishing a short-range connection with another device 302 belonging to the same user group. According to an embodiment, a short-range connection is established by the infrared technique, in which case the portable devices 301, 302 include an infrared transceiver unit 303, 304. For establishing a connection, the infrared transceiver units 303, 304 of the devices are in direct visual contact with each other, so that the infrared connection established therebetween can proceed directly from the infrared transmitter 303 of the device 301 to the infrared receiver 304 of the device 302, or vice versa. Thus the devices 301, 302 must in practice remain in place for maintaining the connection during the data synchronization process. The transmission of the update data from the first device 301 to the second device 302, the comparison of the update data with the data existing in the receiving device 302 and the saving or rejecting of the update data in the receiving device 302 typically take a few seconds at the most. From the point of view of the user, even a very short time is significant, because the device must be kept nearly immobile for maintaining the infrared connection. The infrared connection is typically a connection between two devices. When utilizing the infrared connection, the synchronization of the devices must be activated manually, i.e. the user must feed the synchronization command in his device, when two devices are interconnected. An advantage of the infrared connection is that separate addresses or identifiers are not needed, because the devices indicated by the user are interconnected throughout the synchronization operation.

According to another embodiment, a short-range connection is established by the Bluetooth technique. In that case the devices 301, 302 must include a transceiver chip 303, 304, by which the connection is established. Each device has an individual address, on the basis of which the device is identified. The connections can be arranged between two devices (point-to-point type connections), or they can be multipoint connections (point-to-multipoint type connections), so that a connection can be established simultaneously with several devices. In order to establish a Bluetooth connection, the maximum distance between the devices is roughly 100 meters. By means of the Bluetooth technique, data can be transmitted at the rate of 1-2 megabytes per second. An advantage of the Bluetooth technique is that electromagnetic interference does not significantly affect its functional capacity, but the devices can communicate without difficulty in an environment where electromagnetic radiation occurs. This is mainly due to the high frequency used in a Bluetooth connection, said frequency being 2.45 GHz on average. Other advantages of the Bluetooth technique are its in-built encryption and verification functions, in which case separate encryptions or verifications are not required in these embodiments. Each device has its own individual identifier for establishing the Bluetooth connection.

When the new or altered data is synchronized between the devices of the members of a given user group through a short-range connection, a connection is according to an embodiment always established when two devices belonging to said group arrive at such a mutual coverage distance that a connection can be established. When a short-range connection is established, the first of the devices transmits update data to the second device. The receiving device compares the update data with the information or entry contained in the device memory. Typically there is transmitted a calendar entry, an alarm, a notice or a corresponding piece of information related to a given user group. In case the received update data is timewise more recent, i.e. it has been edited later than the information already existing in the memory of the receiving device, the update data is stored, replacing the older corresponding data. In case a corresponding piece of information does not exist in the receiving device, the new update data is saved in the device. The update can also constitute the deletion of an existing piece of information from the device memory. In case the received update data is detected as older than the corresponding piece of information already existing in the device memory, the received update data is rejected and deleted. Thereafter the earlier receiver transmits the more recent corresponding piece of information from his own device to the transmitter's device to be synchronized. Thus the synchronization of said information between the devices results in that the most recently edited or latest data is transmitted to all members of the given user group. In short-range applications, the connection for transmitting the update data is typically always established between two devices when the devices are in mutual coverage connection. According to an embodiment, the synchronization is carried out at the initiative of a device, i.e. for instance when a user feeds an update command in his device.

Figure 4:
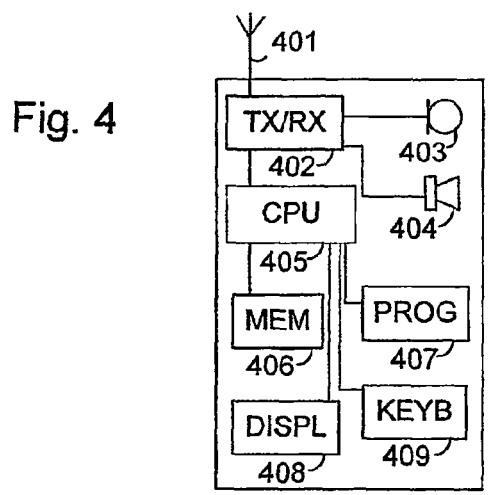
FIG. 4 illustrates a mobile device according to an embodiment of the invention.

The embodiment illustrated in FIG. 4 shows a mobile device according to an embodiment. The device of FIG. 4 is for instance a mobile phone. The user's mobile device is provided with a display 408 for displaying data to the user. The device has a keypad 409 as an example of data input means, which can also be some other corresponding means by which the user feeds data in the device, such as a mouse or a touch pen. The device comprises a memory unit 406 for storing the information. Typically the memory unit includes sections that represent various different types and/or are allocated for different purposes, such as read and write memory, volatile and non-volatile memory, memory space reserved for certain applications and different data structures for efficiently storing information. The control unit 405 transmits data between the device units and functional blocks and takes care of the operation of other units and drivers. For producing audio data, the device of FIG. 4 includes a loudspeaker 404 as an example. Often the devices also include more advanced sound editing means, for example a MIDI (Musical Instrument Digital Interface). For feeding in audio data, the device is provided with a microphone 403.

Data is transmitted to the network and received from the network through an antenna 401 and a transceiver unit 402. The synchronization between the user group devices according to the invention can be carried out by transmitting the information defined as group-related update data through a transceiver unit 402 to the network, and further to other devices belonging to the user group. Data related to the group can be defined by means of an update data software element or means 407. According to an embodiment of the invention, the software 407 is used for looking up the members of a given user group from the memory unit 406 and the update data is transmitted to each member. At least some connection information is stored in the memory of the user group members for establishing a bus between the devices in order to transmit update data. According to an embodiment, the software 407 is also used for identifying the received update data as related to a given user group, for processing the update data for example by comparing it with the already saved information and for recording the update data in the receiving device or for rejecting it. By means of the software 407, it is also possible to show confirmation requests for the user on the display in the various steps of the synchronization process.

In the network the update data is transmitted between the devices by some method known as such. The network can be for example the digital mobile phone network GSM (Global System for Mobile communication) that is widely used in Europe. Other digital wireless telephone techniques are for instance TDMA, time division multiple access, and CDMA, code division multiple access. In a digital mobile phone network, update data is according to an embodiment transmitted in message-form. The transmission of for example text messages (SMS) is simple, because the messages are transmitted from the transmitter network to the short message switching center. From the short message switching center, the messages are transmitted immediately to the receiver, in case the receiver can be reached. If the receiving device is switched off or it is under a switching center through which messages cannot be transmitted, the message remains in the short message switching center in waiting, until the receiving device can next time be contacted. The "Smart Messaging" developed by Nokia (Nokia Corporation, Keilalandentie, Helsinki, Finland) is an application-wise extension to the traditional text message (SMS), and it can be applied, in addition to text messages, in corresponding devices. The Smart Messaging technique is used when transmitting services, updates, picture messages, operator logos etc over the air (OTA). The Smart Messaging technique can also be used for transmitting update data for user groups according to the embodiments of the invention. In that case the connection information looked up for each member of the user group is a telephone number, on the basis of which the message-form update data is transmitted to the receiver.

According to an embodiment, update data is transmitted in message form to the user group members by means of a so-called WAP Push message. WAP Push messages are specially modified text messages (SMS). The WAP specification defines the form in which the applications can create documents based on the XML (Extended Markup Language), (for example Push Access Protocol, i.e. PAP documents), which can be transmitted to the network, to the operator's proxy server (Push Proxy Gateway, PPG). From the proxy server, the WAP Push message can be transmitted to the mobile device. Typically the receiver is identified on the basis of the telephone number. The employed receiver identifier can also be some other identifier (ID). WAP Push messages are typically authenticated, i.e. the authenticity of the receiver is verified for instance by using a device identifier in addition to the receiver identifier.

According to an embodiment, the transmission of the update data is realized by the GPRS (General Packet Radio Services) technique. GPRS is a wireless packet-switched connection technique, where large quantities (56-114 Kbps) of data can be transmitted, and a real-time, interactive connection can be maintained. GPRS adds up to the GSM network, and all features of the GSM network, such as the text message function and Bluetooth connections, also function in the GPRS network. In the GPRS network, update data according to the embodiments can be transmitted between devices by transmission methods known as such.

According to an embodiment, the update data is transmitted through a wireless local network (Wireless Local Area Network, WLAN). In a wireless local connection, a mobile device is connected to a local network (Local Area Network, LAN) through a wireless radio connection. A local network includes base stations in the same way as global networks (for example GSM). The devices are in mutual connection through base stations, but the coverage ranges of the base stations are only about 100-200 meters. Typically a local network is for example the network of an enterprise or a community, such as a school or a hospital.

The update data according to some embodiments of the invention can also be synchronized in other networks, irrespective of the particular transmission method or function. The update data according to the embodiments of the invention can be synchronized between such mobile devices where a given user group can be defined, and where the information of the user group members can be recorded. In addition, the embodiments of the invention require that the devices can in some way establish a mutual connection, through which the update data can be transmitted.

Figure 5:
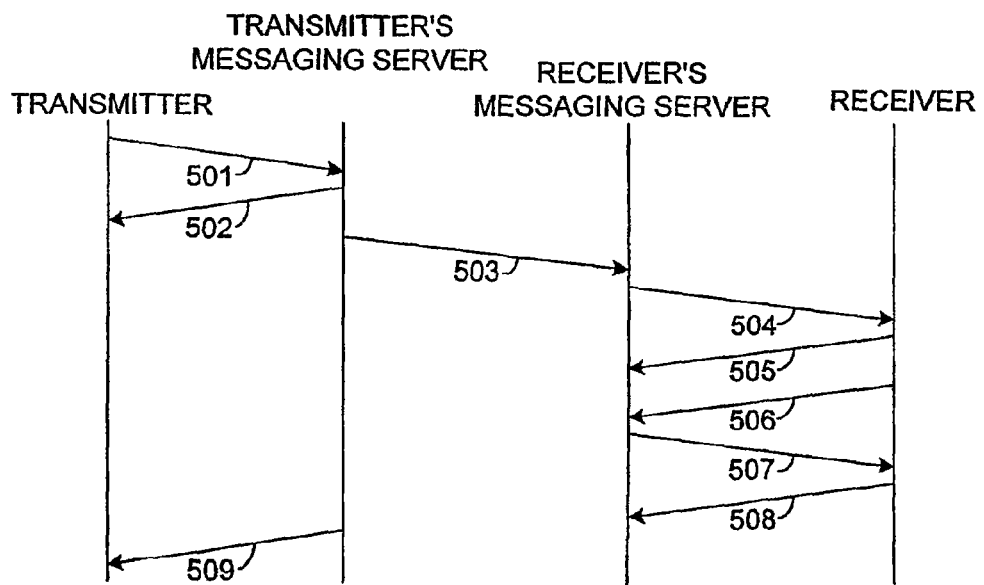
FIG. 5 illustrates transmitting of messages in the network according to an embodiment of the invention.

The embodiment of FIG. 5 illustrates how messages are transmitted in a network when transmitting update data according to an embodiment of the invention. In this embodiment, the update data is transmitted to the receiver as a Push-type message. According to this embodiment, the network cannot establish a connection to the user's device, but the connection is always initiated by the user's device. The devices of FIG. 5 are for example users' mobile devices illustrated in FIG. 4, said devices being interconnected through a given network. In FIG. 5, the transmitting mobile station wishes to transmit update data to a receiver. The transmitting mobile station transmits to its messaging server a message transmission request 501. Along with the message transmission request, also the update data to be transmitted to the receiver is typically transmitted to the messaging server in step 501. From the transmitter's messaging server, the update data is transmitted to the receiver's messaging server 503 through the available general network in a way known as such. Generally the transmitter's messaging server also sends to the transmitter a confirmation of transmitting 502 the update data further.

In step 503, the receiver's messaging server receives the transmitted update data and transmits a notice message of the received update data to the receiver 504. In this step, the receiver gets only identifier information of the transmitted message-form data. The update data proper is still located on the receiver's messaging server. After receiving the notice message 504, the receiver can automatically fetch the update data from the messaging server, from a location that is given in the notice message. If the receiver does not want to get the arrived update data immediately, the receiver transmits a message 505 of receiving the notice message to the messaging server. When the receiver later wishes to get the arrived update data from the messaging server, the receiver transmits an update data request 506 to the messaging server. As a response to the request, the messaging server sends the update data to the receiver 507. The receiver receives the update data and transmits to the messaging server an acknowledgement 508 of receipt. Depending on the definitions, a confirmation 509 of the reception of the update data can thereafter be sent to the transmitter.

According to some embodiments of the invention, even several different procedures can be programmed or defined for transmitting the update data. For instance, the primary transmission method can be the transmission of update data through a Bluetooth connection. In case the connection cannot be established for example during a given period of time, the update data can be transmitted for example in message-form through the network messaging center. Typically the user's device includes for example a log file, in which the time information of the update data is registered in order to find the timewise latest edition, and exactly the latest information can be recorded and synchronized in the rest of the devices belonging to said user group. In addition, information can be saved in the log file of the transmission methods and of those user group devices to which the update data is transmitted and of those to which the update data could not be transmitted. For example in short-range connections, the synchronization between the latter devices can be carried out as a response to an observation that the devices are at a mutual coverage distance, in which case a connection can be established.

The invention claimed is:

1. An apparatus configured to:
   transmit a data update to devices of members representing a given user group,
   record information related to this user group,
   establish a connection to at least one device of this user group,
   define changing information as update data related to the user group,
   automatically transmit the update data for at least one device belonging to the user group through a defined connection bus; and
   keep a log file for keeping register of performed and not performed data updates, for recording time information of the update data and of those user group devices to which the update data is transmitted and of those to which the update data could not be transmitted.

2. An apparatus according to claim 1 wherein it includes an element for verifying the receiver to which the update data is transmitted.

3. An apparatus according to claim 1, wherein it includes an element for updating calendar entries between the members of a given user group.

4. An apparatus comprising:
   a control, at least one memory, and software, the at least one memory and the software configured to, with the control, cause the apparatus at least to:
   receive data updates from devices of members of a given user group,
   establish a connection with at least one device of the user group members,
   receive data defined to be updated,
   record received update data in the apparatus,
   maintain information on time information related to data,
   compare the received update data with corresponding data already existing in the device and
   update this existing data based on the received update data as a response to a situation, in which the received update data is timewise more recent than the corresponding data already existing in the device.

5. An apparatus according to claim 4, the at least one memory and the computer program code are configured to, with the at least one processor, cause the apparatus to process received update data.

6. An apparatus according to claim 4, the at least one memory and the computer program code are configured to, with the at least one processor, cause the apparatus to receive the update data through a local wireless network.

7. An apparatus according to claim 4, the at least one memory and the computer program code are configured to, with the at least one processor, cause the apparatus to receive message-form update data from a network messaging center.

8. A method, comprising:
   updating changing information between devices belonging to a given user group,
   defining the changing information as update data related to said user group,
   transmitting the update data automatically to at least one device belonging to the user group through a defined connection bus, and
   keeping register of performed and not performed data updates in a log file, recording time information of the update data and of those user group devices to which the update data is transmitted and of those to which the update data could not be transmitted.

9. A method comprising:
   updating changing information between devices belonging to a given user group,
   receiving update data defined as related to said user group through a defined connection bus,
   saving or rejecting the update data in a receiving device,
   recording time information of the update data,
   maintaining information on on time information related to data,
   comparing the received update data with corresponding information already existing in the receiving device, and
   updating the corresponding information already existing in the receiving device with the received update data only in case the received update data is timewise more recent than the corresponding information already existing in the receiving device.

10. A method according to claim 9, wherein the received update data is processed in the receiving device.

11. A non-transitory computer readable medium having computer software thereon for updating data between devices belonging to a given user group, the computer software including
- a software element for defining updating changing information between devices belonging to a given user group,
- a software element for defining the changing information as update data related to said user group,
- a software element for defining transmitting the update data automatically to at least one device belonging to the user group through a defined connection bus, and
- a software element for defining keeping register of performed and not performed data updates in a log file, recording time information of the update data and of those user group devices to which the update data is transmitted and of those to which the update data could not be transmitted.

12. A non-transitory computer readable medium having computer software stored thereon for updating data between devices belonging to a given user group, the computer software including
- a software element for defining updating changing information between devices belonging to a given user group,
- a software element for receiving update data defined as related to said user group through a defined connection bus,
- a software element for saving or rejecting the update data in a receiving device,
- a software element for recording time information of the update data,
- a software element for maintaining information on on time information related to data,
- a software element for comparing the received update data with corresponding information already existing in the receiving device, and
- a software element for updating the corresponding information already existing in the receiving device with the received update data only in case the received update data is timewise more recent than the corresponding information already existing in the receiving device.

* * * * *

UNITED STATES PATENT AND TRADEMARK OFFICE
CERTIFICATE OF CORRECTION

PATENT NO. : 8,260,282 B2
APPLICATION NO. : 13/240499
DATED : September 4, 2012
INVENTOR(S) : Kuivalainen Page 1 of 1

It is certified that error appears in the above-identified patent and that said Letters Patent is hereby corrected as shown below:

In the Specifications:

Column 7,
Line 62, "Keilalandentie" should read --Keilalahdentie--.

Signed and Sealed this
Twenty-third Day of April, 2013

Teresa Stanek Rea
*Acting Director of the United States Patent and Trademark Office*